Figure 1:
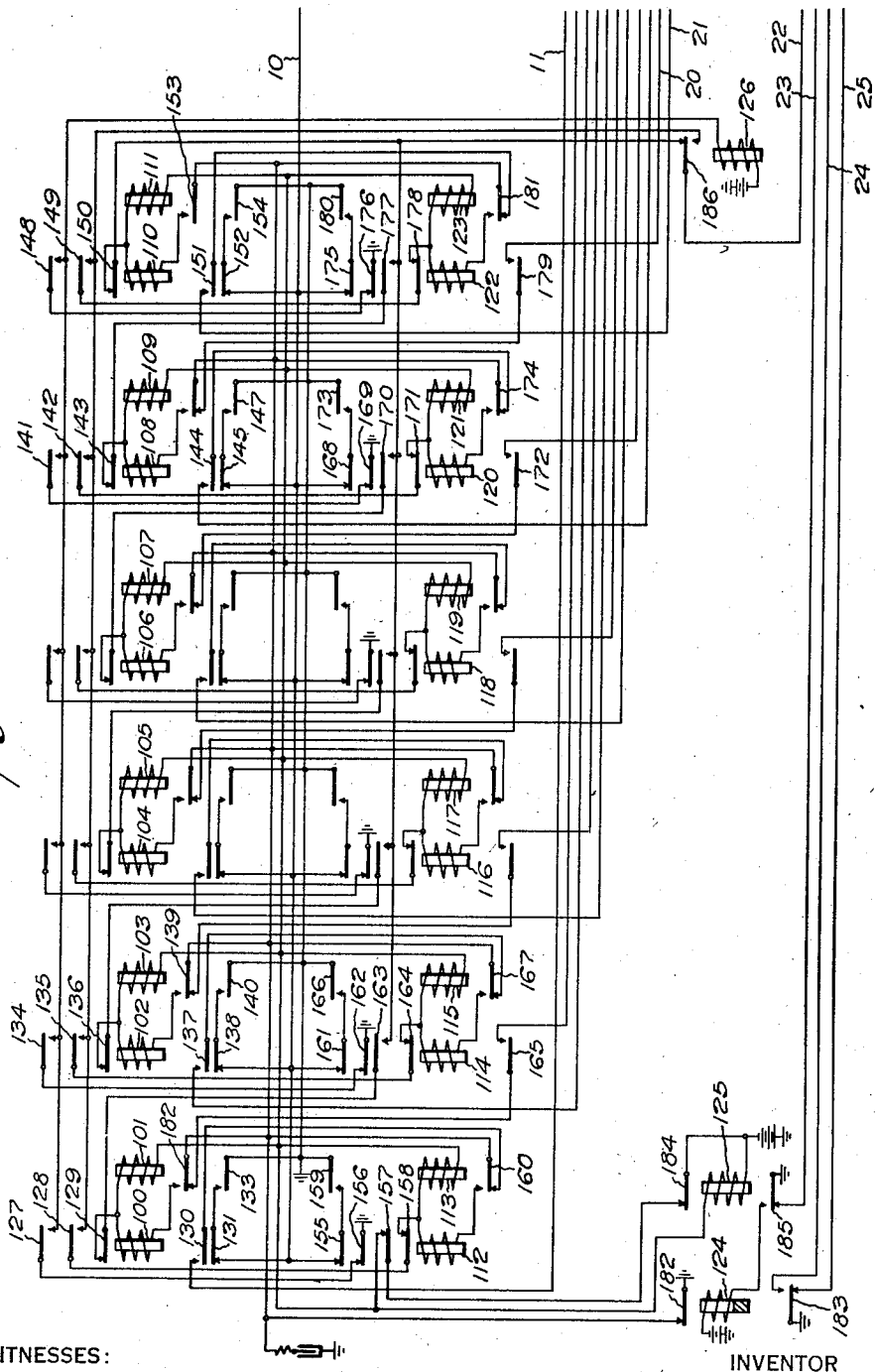

Aug. 4, 1931.  R. C. HUMMEL  1,817,439

SUPERVISORY CONTROL

Original Filed March 31, 1926  7 Sheets-Sheet 1

WITNESSES:
G. S. Neilson
Samuel ...

INVENTOR
Robert C. Hummel
BY
Wesley G. Carr
ATTORNEY

Aug. 4, 1931.  R. C. HUMMEL  1,817,439
SUPERVISORY CONTROL
Original Filed March 31, 1926    7 Sheets-Sheet 5

WITNESSES:

INVENTOR
Robert C. Hummel
BY
Wesley C. Carr
ATTORNEY

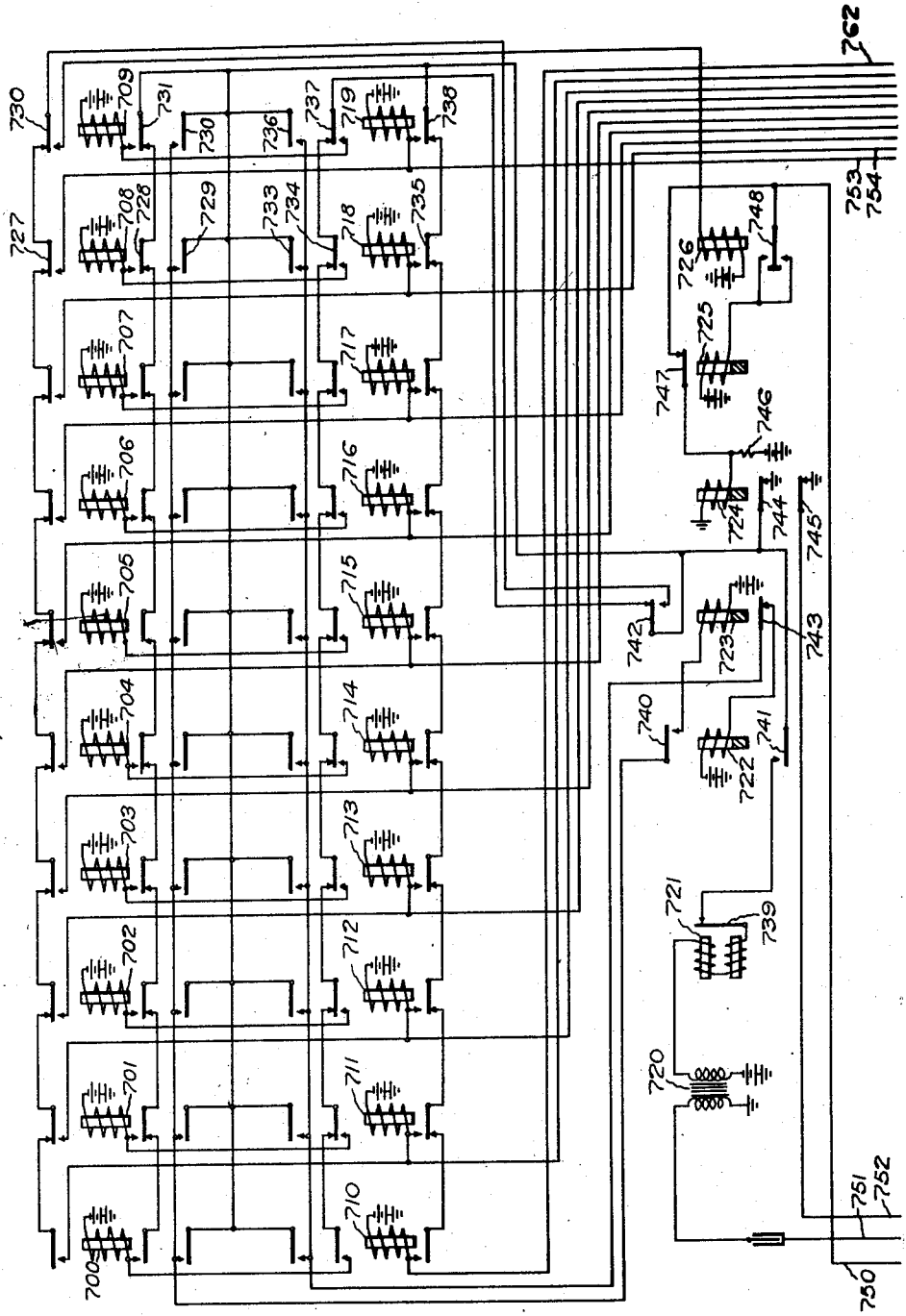

Patented Aug. 4, 1931

1,817,439

UNITED STATES PATENT OFFICE

ROBERT C. HUMMEL, OF EVERETT, WASHINGTON, ASSIGNOR TO WESTINGHOUSE ELECTRIC & MANUFACTURING COMPANY, A CORPORATION OF PENNSYLVANIA

SUPERVISORY CONTROL

Application filed March 31, 1926, Serial No. 98,656. Renewed April 15, 1929.

My invention relates, in general, to systems for supervising and controlling, from a central point, remotely disposed electrical equipment.

One of the objects of my invention is to provide improved selective apparatus and circuits for selectively controlling and supervising remotely-disposed electrical equipment in a station or substation from a central point or dispatcher's office.

Another object of my invention is to provide means for returning an answer-back signal to the dispatcher's office after the desired apparatus unit has been selected to indicate such selection.

Another object of my invention is to provide audible means for apprising the dispatcher of the proper operation of the selecting apparatus.

A still further object of my invention is to provide a special relay code sender at the substation for indicating to the dispatcher the proper operation of the selecting apparatus.

There are other objects of the invention which, together with the foregoing, will be described in the detailed specification which is to follow.

Referring now to the drawings, comprising Figures 1 to 7, inclusive, sufficient apparatus and circuits have been shown, by means of the conventional diagrams, to enable my invention to be readily explained and understood.

Figure 2:
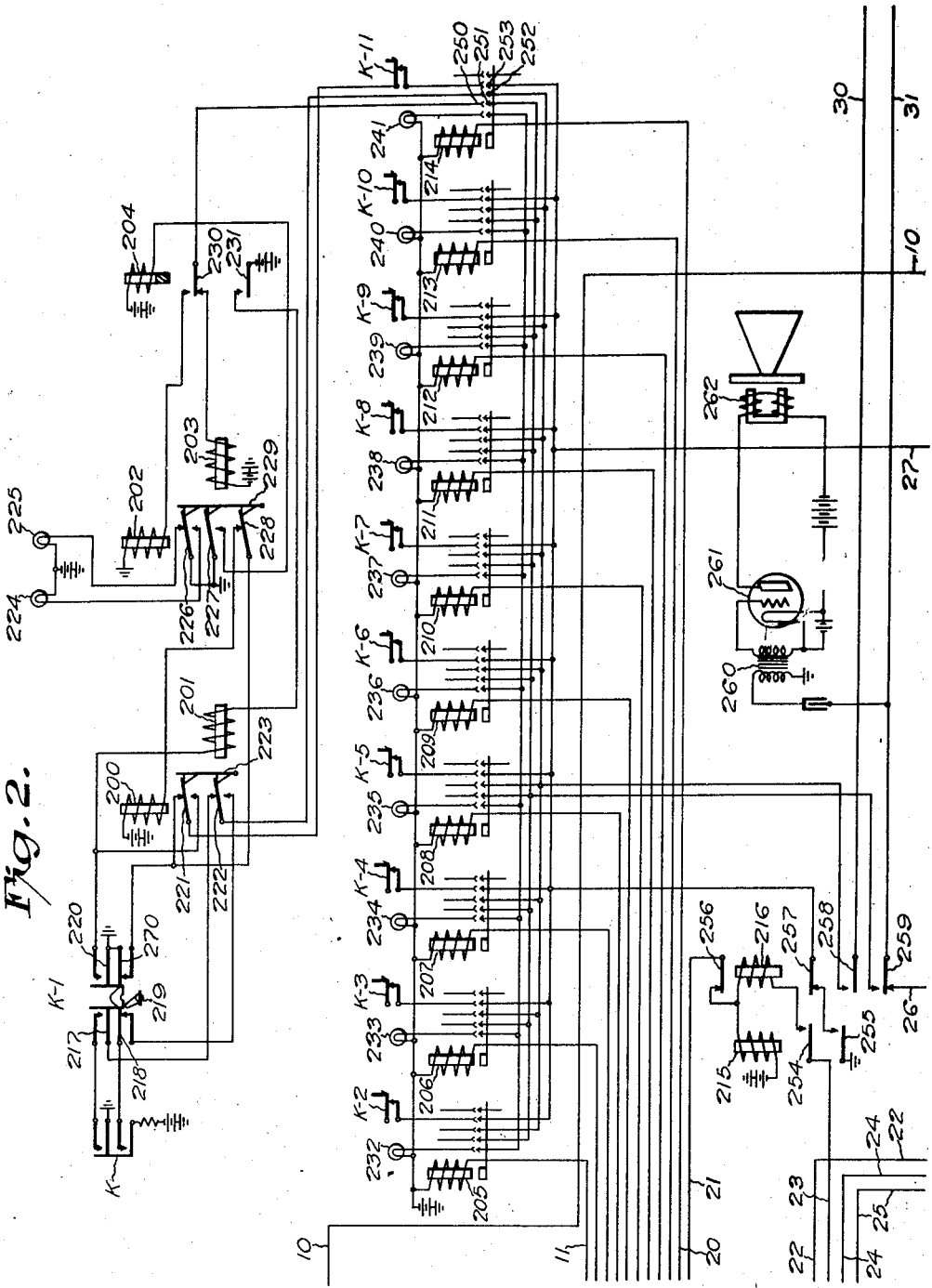
Figure 3:
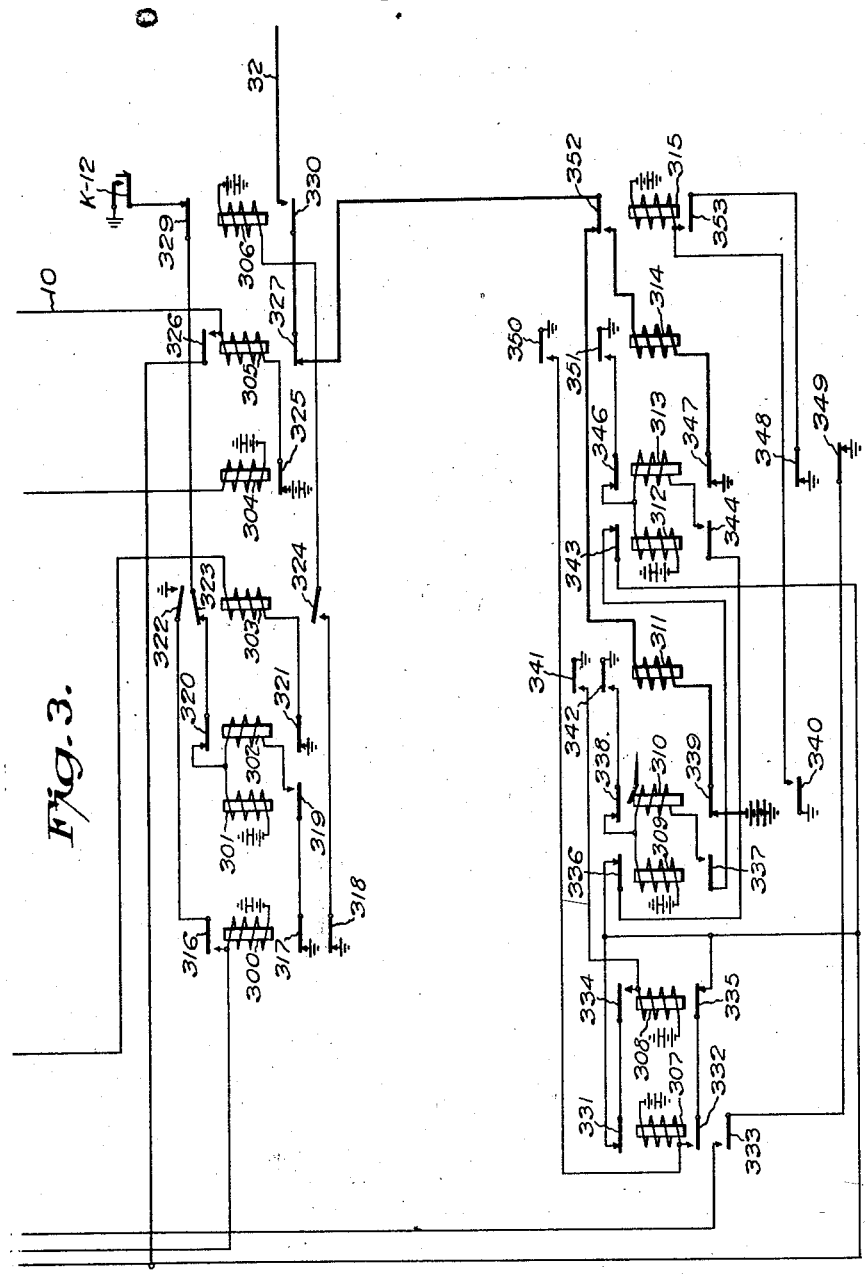

The apparatus and circuits shown in Figs. 1 to 3, inclusive, are those located at the dispatcher's office, while the apparatus and circuits shown in Figs. 4 to 7, inclusive, are those located in the station or substation.

In practicing my invention, I provide a group of counting relays at the office and station, respectively. A group of selecting relays is associated with each group of counting relays. A control key is provided at the dispatcher's office for each apparatus unit that it is desired to control. Two signalling devices are associated with each one of these keys to indicate to the dispatcher the condition of the corresponding apparatus unit at the substation. A start key is also provided at the dispatcher's office. There is also a key associated with each selecting relay so that the dispatcher may select any apparatus unit and remain in connection therewith as long as he desires.

A driving circuit is provided for operating the relays in the counting relay groups at the dispatcher's office and station in a predetermined sequence. A relay code-sending device is also provided at the substation for sending back a code signal to the dispatcher's office, responsive to the operation of the selecting apparatus at the station.

Briefly, the operation of the system proceeds as follows: when the dispatcher desires to bring about the operation of the circuit interrupter at the station, he will operate the key K associated with this unit and will then operate the start key. By the latter operation, the driving circuit begins to function to operate the relays in the counting relay chain in a predetermined sequence.

By the operation of the counting relay chain, the selecting relays at the office and station are operated in a definite sequence to select various apparatus units and signalling devices. When the desired unit is selected, the action of the driving circuit is interrupted. The code-sending relay at the substation then operates to send back a code to the dispatcher's office to indicate that the proper apparatus unit has been selected. The dispatcher will then operate the common control key to cause the operation of the selected unit at the station.

By the operation of the selected unit, a signalling circuit is completed for operating the proper signalling device at the dispatcher's office to apprise the dispatcher of the completion of the desired action at the station. When the signalling device is operated, the driving circuit resumes its operation and the apparatus is restored to normal at the dispatcher's office and the station when the last counting relays in the groups are operated.

In the event that an apparatus unit is operated at the substation, either manually or automatically, the selecting operation of the relay apparatus ensues and the proper signalling devices are actuated in order to apprise the dispatcher of the action at the station.

Referring now more particularly to Fig. 1, relays 100 to 123, inclusive, comprise the counting relay group at the dispatcher's office. Relays 124 to 126, inclusive, control certain actions of the relay selecting apparatus.

In Fig. 2, relays 205 to 214, inclusive, comprise the group of selecting relays at the office. These relays have been shown as a special type of multi-contact relay, but it is understood that any type of multi-contact relay may be used. Key K is of the usual single-throw, non-locking type and is common to all the keys, such as K—1. Key K—1 is one of a plurality of control keys and is a special type of locking, double-throw key.

When a handle 219 is turned, springs 217, 218, 220 and 270 assume a position opposite from that shown. When the handle 219 is turned in the opposite direction, the springs are reoperated to the position shown in the drawings. Relays 200 to 204, inclusive, are associated with each key, such as K—1. Relays 200 and 201 have their armatures so disposed with respect to each other that the armature 223 of the relay 201, when in retracted position, is adapted to maintain the armatures 221 and 222 of the relay 200 in an operated position. Relays 202 and 203 are similarly constructed and positioned, and control the operation of signalling devices 224 and 225 that indicate the operation of the corresponding apparatus units at the substation. The relay 204 is a slow-releasing relay of the usual type. Relays 215 and 216 control certain signalling and control operations, in a manner that will subsequently appear.

A transformer 260 is of the usual type and comprises a portion of the circuit including the audio frequency amplifier 261. The amplifier 261 is of the usual three-electrode, vacuum-tube type and is adapted to operate a loud speaker 262. The loud speaker 262 may be of any well known or desired construction.

Relays 300 to 315, inclusive, (Fig. 3), comprise the driving circuit at the dispatcher's office. Key K—12 is a start key and is of the usual single-throw, non-locking type.

Figure 4:
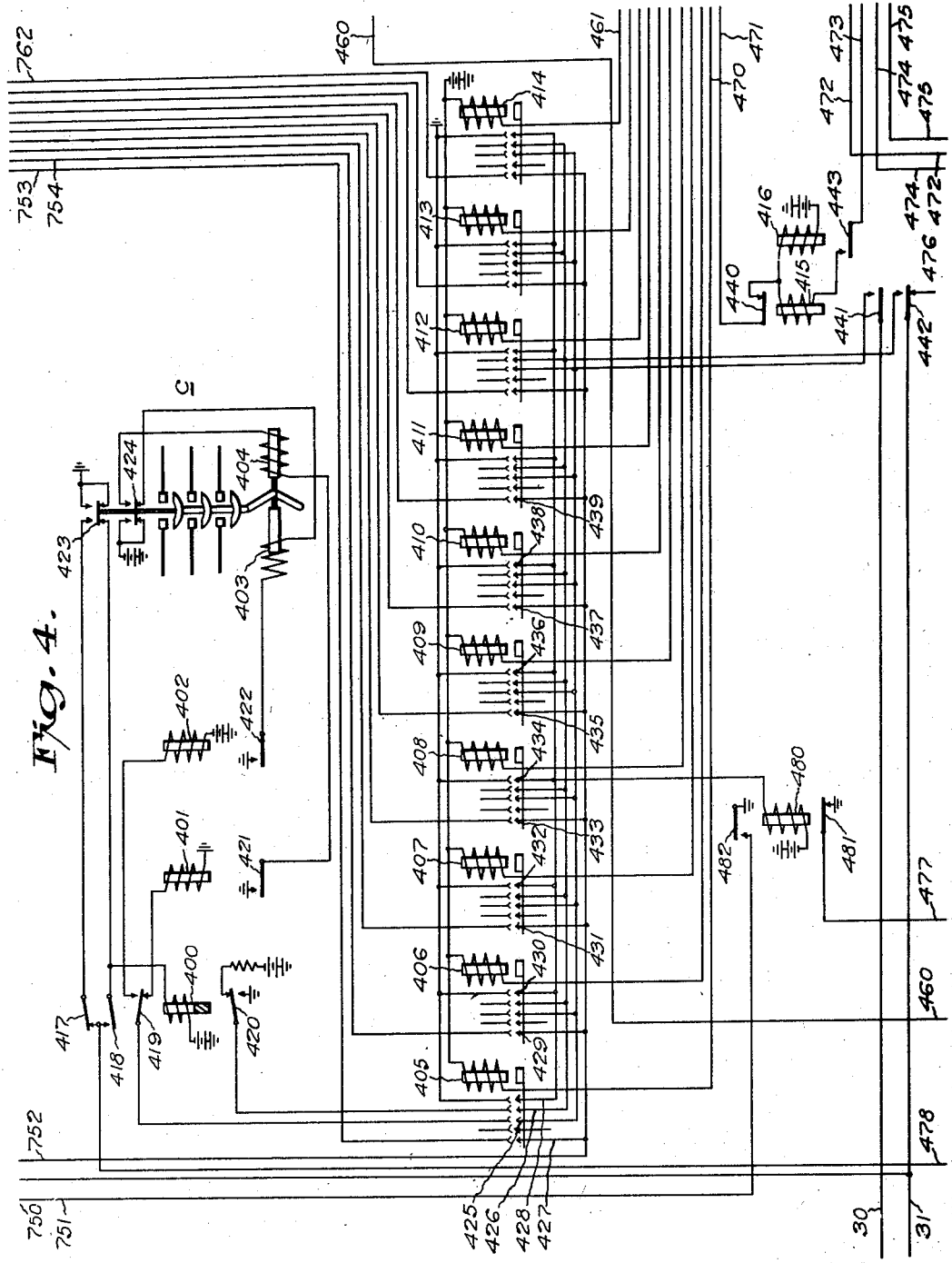
Figure 5:
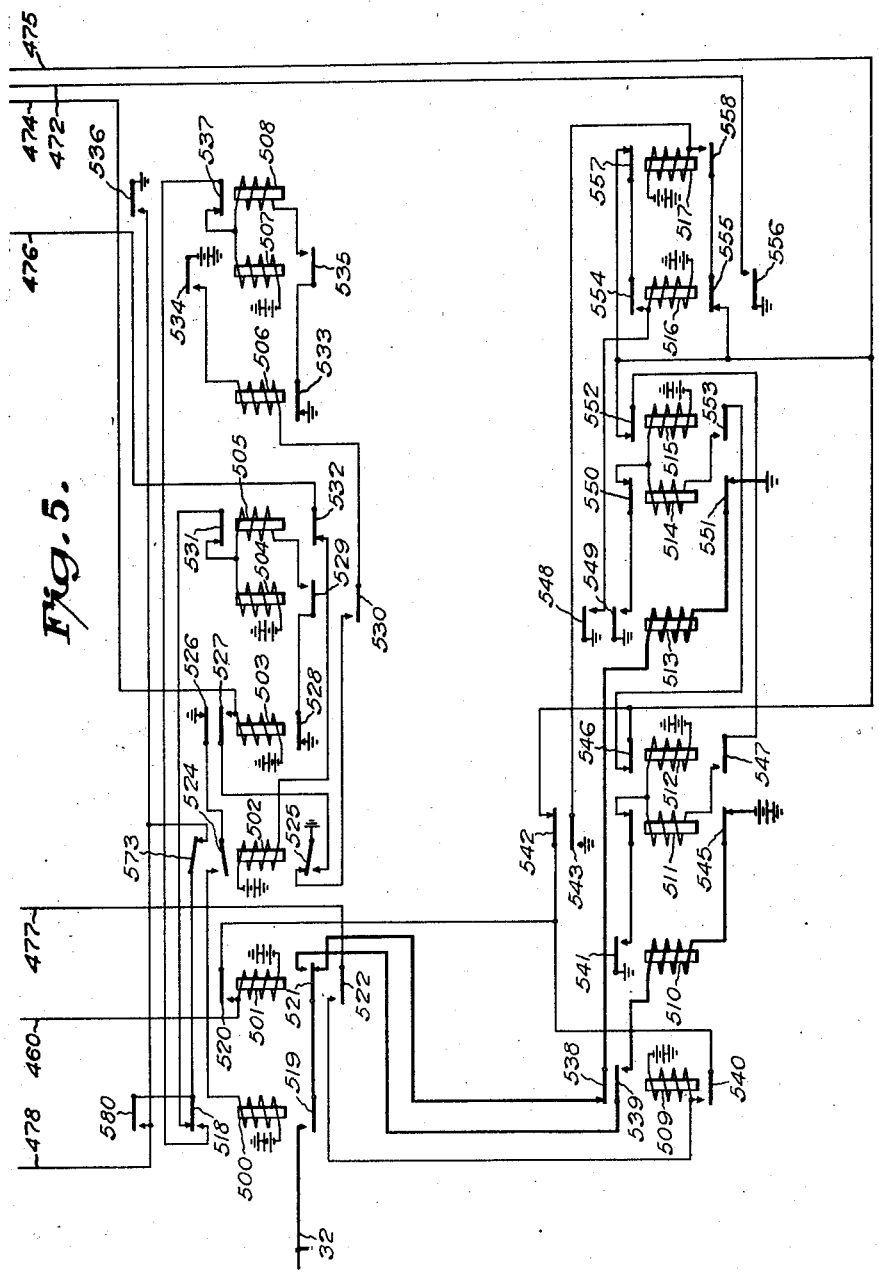

In Fig. 4, relays 405 to 414, inclusive, comprise the group of selecting relays at the station. There are three relays associated with each apparatus unit that it is desired to control. Relays 400 to 402, inclusive, are associated with the circuit interrupter C. The circuit interrupter C may be of any usual or well known type and may perform any desired operation at the station, such as connecting two feeder circuits together. Relays 480, 415 and 416 control certain selecting operations, as will appear.

Relays 500 to 517, inclusive, (Fig. 5), constitute the driving circuit at the station.

Figure 6:
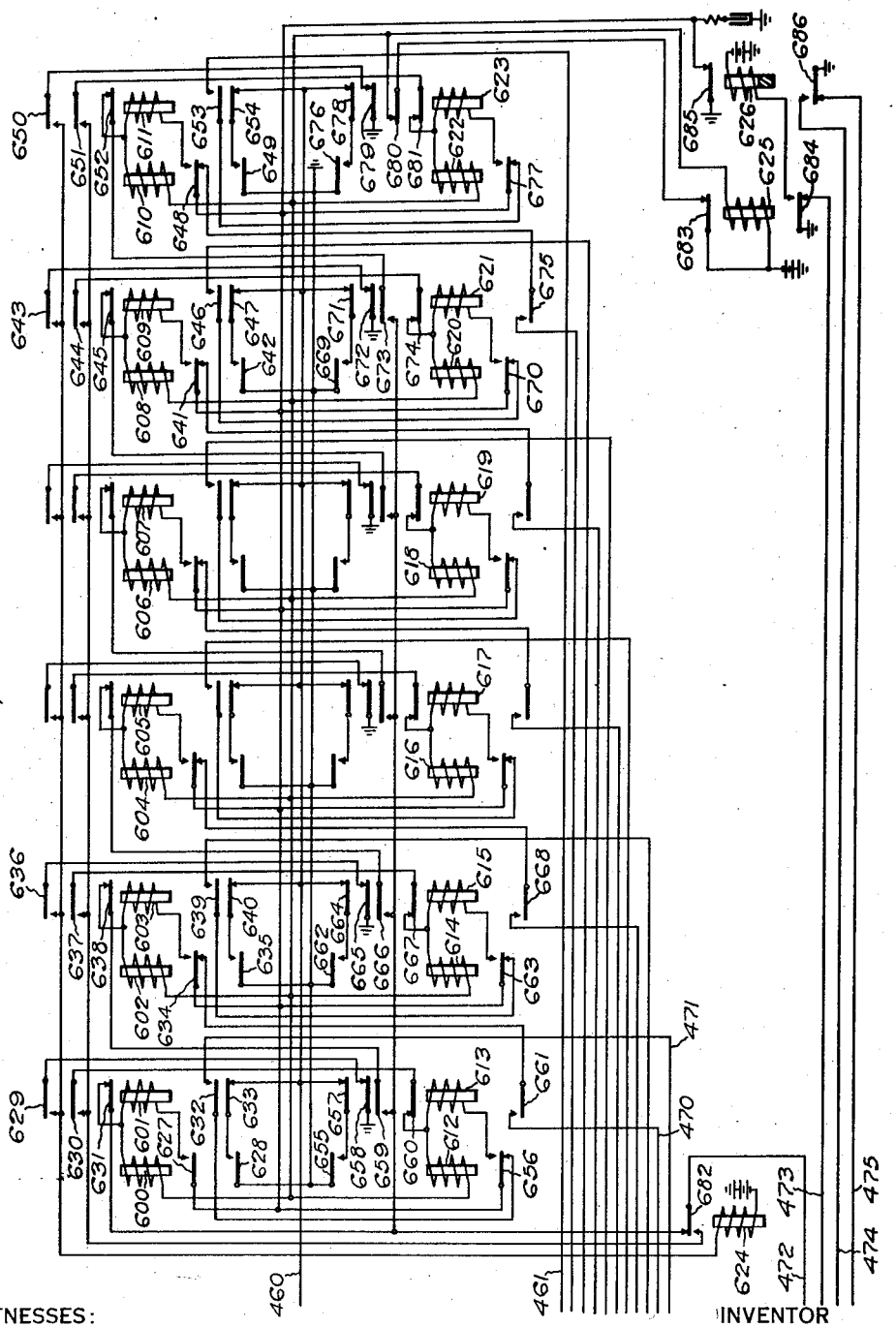

In Fig. 6, relays 600 to 603, inclusive, comprise the chain of counting relays at the station. Relays 624 to 626, inclusive, control certain impulsing and releasing operations, which will be described subsequently.

In Fig. 7, relays 700 to 719, inclusive, comprise the relay code-sending apparatus at the substation. These relays are of the usual type, (with the exception of the relays 721 and 726.) The relay 721 may be an ordinary form of buzzer, while the relay 726 has its armature so constructed that, when released, it vibrates for a short interval, engaging both its front and back contacts. This may be accomplished by the use of a weighted spring operated by the armature of the relay in a well known manner. A device 720 is an ordinary audio-frequency transformer.

Having briefly described the apparatus shown in the drawings, I will now explain its detailed operation. For this purpose, it will be assumed that the dispatcher desires to bring about the closure of the circuit interrupter C. In order to accomplish this result, the dispatcher will operate the key K—1 in the position oposite from that shown and will then depress the start key K—12 momentarily.

Normally, the selecting apparatus is held inoperative by a holding circuit that extends from ground by way of back contact and armature 321, holding relay 303, conductor 26, back contact and armature 259, conductor 31, armature 442 and its back contact, conductor 476, armature 532 and its back contact, and holding relay 502 to battery. The operation of the holding relay 303 at the office brings about the opening of the locking circuit of the relay 300 at armature 322, the preparation of a starting circuit at armature 323 and the opening of an additional point in the circuit of the relay 306 at armature 324.

At the substation, the operation of the holding relay 502 causes the preparation of a starting circuit at armature 573, the opening of an additional point in the circuit of the relay 500 at armature 524, and the preparation of a circuit for the relay 506 at armature 525.

When the key K—12 is depressed, a circuit is completed which extends from ground by way of the springs of said key, back contact and armature 329, armature 323 and its front contact, armature 320 and its back contact, and relay 301 to battery. The relay 301 is energized to complete a circuit extending from ground by way of back contact and armature 317, armature 319 and its front contact, relay 302 and relay 301 to battery. The relay 302 is short-circuited so long as the key K—12 remains depressed. When this key is released, the short-circuit is removed from the relay 302 and this relay is energized to open the holding circuit, whereby the relays 303 and 502 are deenergized.

Upon being deenergized, the relay 303 completes a circuit for the relay 306 at armature 324, opens an additional point in the starting circuit at armature 323, and at armature 322 prepares a locking circuit for the relay 300. The relay 306 is operated to open a further point in the starting circuit at armature 329, and to prepare one point in the driving circuit at armature 330.

At the station, the relay 502 is deenergized to open one point in the starting circuit at armature 573, to complete a circuit for the relay 500 at armature 524, and to prepare a locking circuit for the relay 503 at armature 525. The relay 500 is operated to complete another point in the driving circuit at armature 519.

The driving circuit is now closed over a path that extends from battery by way of back contact and armature 339, line relay 311, back contact and armature 352, back contact and armature 327, armature 330 and its front contact, trunk conductor 32, front contact and armature 519, armature 521 and its back contact, back contact and armature 538, line relay 513, and armature 551 and its back contact to ground.

The line relay 311 is operated to complete a circuit for the relay 308 at armature 341 and to complete a circuit for the relay 309 at armature 342. The relay 309 is energized to open one point in the locking circuit of the relays 312 and 313 at armature 336, and to complete a circuit for the relay 310 at armature 337 over a path that extends from ground by way of armature 183 and its back contact, conductor 25, armature 343 and its back contact, armature 337 and its front contact, relay 310 and relay 309 to battery. This circuit is not operative to cause the energization of the relay 310 until the short-circuit is removed therefrom by the deenergization of the relay 311. The relay 308 is operated to open one point in the locking circuit of the relay 307 at armature 335, and to establish a locking circuit for itself at armature 334 to ground upon grounded conductor 25.

At the substation, the line relay 513 is operated to complete a circuit for the relay 516 at armature 548, and to complete a circuit for the relay 515 at armature 549. The relay 515 is operated to open one point in the circuit of the relays 511 and 512 at armature 552, and to complete a circuit for the relay 514 at armature 553 over a path that extends from ground by way of armature 686 and its back contact, conductor 475, armature 546 and its back contact, armature 553 and its front contact, relay 514 and relay 515 to battery. This circuit does not operate to energize the relay 514 until the short-circuit is removed from this relay by the deenergization of the relay 513.

The relay 516 is operated to open one point in the locking circuit of the relay 517 at armature 555, to establish a locking circuit for itself at armature 554, to ground upon grounded conductor 475, and to complete a circuit at armature 556 that may be traced from ground by way of said armature and its front contact, conductor 472, armature 682 and its back contact, armature 631 and its back contact, counting relay 600, back contact and armature 680, and back contact and armature 683 to battery.

The counting relay 600 is energized over this circuit and operates to complete a circuit at armature 627 that extends from ground by way of armature 685 and its back contact, armature 627 and its front contact, relay 601, relay 600, back contact and armature 680, and back contact and armature 683 to battery, and to complete a circuit at armature 628 that may be traced from ground by way of said armature and its front contact, armature 633 and its back contact, conductor 460, and relay 501 to battery.

The relay 501 is energized to establish a locking circuit for itself at armature 520, to open the driving circuit including the line relays 311 and 513 at armature 521, to connect the driving circuit to the armature 539 of the relay 509 at the front contact of armature 521, and to complete a circuit for the relay 509 at armature 522. The locking circuit of the relay 501 extends from ground by way of grounded conductor 475, back contact and armature 542, armature 520 and its front contact, and relay 501 to battery.

The circuit for the relay 509 may be traced from ground by way of back contact and armature 481, conductor 477, armature 522 and its front contact, and relay 509 to battery. The relay 509 is operated to open an additional point in the circuit of the line relay 513 at armature 538, to establish a locking circuit for itself at armature 540, and to prepare a circuit for the line relay 510 at armature 539. It will be obvious that, by the operation of the relays 501 and 509, the circuit of the line relays 311 and 513 is opened. The relay 513 is deenergized to remove the short-circuit from the relay 514. The relay 514 operates to open another point in the circuit of the relay 513.

At the dispatcher's office, the relay 311 is deenergized to remove the short-circuit from the relay 310. The relay 310 is operated to open another point in the original circuit of the relay 309 at armature 338, to open another point in the circuit of the relay 311 at armature 339, and to complete a circuit at armature 340 for the relay 315. The relay 315 is energized to establish a locking circuit for itself at armature 353, to disconnect the line relay 311 from the driving circuit at armature 352 and to connect the driving circuit to the relay 314 at the front contact of this armature.

The driving circuit now extends from ground by way of back contact and armature 347, line relay 314, front contact and armature 352, back contact and armature 327, armature 330 and its front contact, trunk conductor 32, front contact and armature 519, armature 521 and its front contact, armature 539 and its front contact, line relay 510, and armature 545 and its back contact to battery. The line relays 314 and 510 are energized over this circuit.

The line relay 314 is operated to complete a circuit for the relay 307 at armature 350 and to complete a circuit for the relay 312 at armature 351. The relay 312 is operated to open the circuits of the relays 309 and 310 at armature 343 and to prepare a circuit for the relay 313 at armature 344. The relay 310 is deenergized to prepare a circuit for the relay 309 at armature 338, to prepare a circuit for the line relay 311 at armature 339, and to open the original energizing circuit of the relay 315 at armature 340. The relay 309 is deenergized to open another point in the circuit of the relay 310 at armature 337, and to complete a circuit that extends from ground upon grounded conductor 25, back contact and armature 336, armature 344 and its front contact, relay 313 and relay 312 to battery. The relay 313 is short-circuited so long as the relay 314 is energized and, consequently, the relay 313 is not energized.

The relay 307 is operated to prepare a locking circuit for itself at armature 332, to open the locking circuit of the relay 308 at armature 331, and to complete an impulsing circuit at armature 333. The relay 308 is deenergized to complete a locking circuit for the relay 307 to ground upon grounded conductor 25 at armature 335.

The impulsing circuit just mentioned extends from ground by way of back contact and armature 349, armature 333 and its front contact, conductor 22, armature 186 and its back contact, armature 150 and its back contact, counting relay 111, back contact and armature 157, and back contact and armature 184 to battery.

The counting relay 111 is energized over this circuit and operates to complete a circuit at armature 153 that extends from ground by way of armature 182 and its back contact, armature 153 and its front contact, relay 110, relay 111, back contact and armature 157, back contact and armature 184 to battery, and to complete a circuit at armature 154 that extends from ground by way of said armature and its front contact, armature 152 and its back contact, conductor 10, relay 305, and armature 325 and its back contact to battery. The relay 305 is energized to establish a locking circuit for itself at armature 326 to ground upon grounded conductor 25, and to open the driving circuit at armature 327 that includes the line relays 314 and 510.

At the substation, the line relay 510 is operated to complete a circuit for the relay 510 at armature 541. The relay 512 is energized to open the circuit of the relay 514 and 515 at armature 546 and to prepare a circuit for the relay 511 at armature 547. The relay 514 is deenergized to prepare a circuit for the relay 515 at armature 550, and to prepare a circuit for the relay 513 at armature 551. The relay 515 is deenergized to open one point in the circuit of the relay 514 at armature 553, and to complete a circuit that extends upon grounded conductor 475 by way of back contact and armature 552, armature 547 and its front contact, relay 511 and relay 512 to battery. This circuit is not effective to energize the relay 511 until the short-circuit is removed from this relay by the deenergization of the relay 510.

When the driving circuit is opened by the operation of the relay 305, the relay 314 is deenergized, as before mentioned. Upon being deenergized, the relay 314 opens one point in the original energizing circuit for the relay 307 at armature 350, and at armature 351 removes the short-circuit from the relay 313. The relay 313 is immediately operated to open another point in the original circuit for the relay 312 at armature 346, to open another point in the circuit of the line relay 314 at armature 347, to open the locking circuit of the relay 315 at armature 348, and to open the impulsing circuit at armature 349. The relay 315 is deenergized to disconnect the line relay 314 from the driving circuit and to connect the line relay 311 thereto at armature 352.

When the impulsing circuit is opened, the short-circuit is removed from the counting relay 110 and this relay is permitted to operate. Upon operating, the relay 110 opens another point in the original energizing circuit of the relay 111 at armature 150, prepares a circuit for the counting relay 123 at armature 149, removes ground from the conductor 10 at armature 152, completes a circuit at armature 148 that extends from ground by way of armature and back contact 176, armature 148 and its front contact, and relay 126 to battery, and at armature 151 completes a circuit that extends from ground by way of armature 182 and its back contact, armature 181 and its back contact, armature 151 and its front contact, conductor 21, armature 256 and its back contact, and relay 215 to battery.

The relay 215 is energized to complete a circuit that extends from ground by way of armature 185 and its back contact, conductor 23, armature 254 and its front contact, relay 216 and relay 215 to battery, and at armature 255 completes a circuit that extends from ground by way of said armature and its front contact, back contact and armature 257, conductor 27, and relay 304 to battery. The relay 216 is short-circuited so long as the original energizing circuit for the relay 215 is completed. The relay 126 is operated to prepare another circuit for the relay 123.

The relay 304 is energized to open the locking circuit of the relay 305 which is deenergized. The relay 305 retracts the armature 327 to prepare one point in the driving circuit.

At the substation, the line relay 510 is deenergized by the opening of the driving circuit to remove the short-circuit from the relay 511. As a result of this operation, the relay 511 is operated to open the locking circuit of the relays 501 and 509 at armature 542, to complete a circuit for the relay 517 at armature 543, to open an additional point in the original circuit of the relay 512 at armature 544, and to open an additional point in the circuit of the line relay 510 at armature 545.

The relay 517 is energized to open the locking circuit of the relay 516 at armature 557 and to prepare a locking circuit for itself at armature 558. The relay 516 is deenergized to complete a locking circuit for the relay 517 at armature 555 and to open the impulsing circuit at armature 556. By the opening of the impulsing circuit, the short-circuit is removed from the counting relay 601 and this relay is energized.

Upon operating, the relay 601 opens one point in the original energizing circuit of the relay 600 at armature 631, prepares a circuit for the counting relay 612 at armature 630, completes a circuit at armature 629 that extends from ground by way of armature and back contact 658, armature 629 and its front contact and relay 624 to battery, removes ground from conductor 460 at armature 633, and at armature 632 completes a circuit that extends from ground by way of armature 685 and its back contact, armature 656 and its back contact, armature 632 and its front contact, conductor 471, armature 440 and its back contact, and relay 416 to battery. The relay 624 is energized to prepare another point in the circuit of the counting relay 612.

The removal of ground from conductor 460 causes the opening of the original energizing circuit of the relay 501. By the removal of ground from conductor 460, the relay 501 is deenergized to open the original circuit of the relay 509 at armature 522, and to connect the driving circuit to the back contact of armature 538 of relay 509 at armature 521. The relay 509 is deenergized to connect the line relay 513 to the driving circuit and to open another point in the circuit of the relay 510 at armature 539.

The relay 416 is energized to complete a circuit that extends from ground by way of armature 684 and its back contact, conductor 473, armature 443 and its front contact, relay 415, and relay 416 to battery. This circuit is not effective so long as the original circuit for the relay 416 is maintained.

By the deenergization of the relays 501 and 509, the driving circuit is completed. This driving circuit extends from battery by way of back contact and armature 339, line relay 311, back contact and armature 352, back contact and armature 327, armature 330 and its front contact, conductor 32, front contact and armature 519, armature 521 and its back contact, back contact and armature 538, line relay 513, and armature 551 and its back contact to ground. The line relays 311 and 513 are energized over this circuit.

The line relay 311 is operated to complete a circuit for the relay 309 at armature 342, and to complete a circuit for the relay 308 at armature 341. The relay 309 is energized to open the circuits of the relays 312 and 313 at armature 336, and to prepare a circuit for the relay 310 at armature 337. The relay 313 is deenergized to prepare a circuit for the relay 312 at armature 346, to prepare a circuit for the line relay 314 at armature 347, to close one point in the locking circuit of the relay 315 at armature 348, and to close one point in the impulsing circuit at armature 349. The relay 312 is deenergized to open one point in the circuit of the relay 313 at armature 344, and to complete the circuit of the relay 310 at armature 343. The relay 310 is not energized so long as the original circuit for the relay 309 is maintained. The relay 308 is operated to open the locking circuit of the relay 307 at armature 335, and to prepare a locking circuit for itself at armature 334. The relay 307 is deenergized to complete the locking circuit of the relay 308 and to open another point in the impulsing circuit at armature 333.

At the substation, the relay 513 is energized to complete a circuit for the relay 516 at armature 548, and to complete a circuit for the relay 515 at armature 549. The relay 515 is operated to open the circuit of the relays 511 and 512 and to prepare a circuit for the relay 514. The relay 511 is deenergized to prepare a circuit for the relay 512 at armature 544, to prepare a circuit for the line relay 510 at armature 545, to open the original energizing circuit of the relay 517 at armature 543, and to prepare a locking circuit for the relays 501 and 509 at armature 542.

The relay 516 is energized to prepare a locking circuit for itself at armature 554, to open the locking circuit of the relay 517 at armature 555, and to complete an impulsing circuit at armature 556. The relay 517 is deenergized to close the locking circuit of the relay 516.

The impulsing circuit just mentioned extends from ground by way of armature 556 and its front contact, conductor 472, armature 682 and its front contact, front contact and armature 630, armature 660 and its back contact, counting relay 612, back contact and armature 680, and back contact and armature 683 to battery.

The counting relay 612 is energized over this circuit and operates to open the circuit of the relay 416 at armature 656, to complete a circuit at the front contact of this armature that extends from ground by way of armature 685 and its back contact, armature 656 and its front contact, relay 613, relay 612, back contact and armature 680, and back contact and armature 683 to battery, and at armature 655 completes a circuit that extends from ground by way of said armature and its front contact, armature 657 and its back contact, conductor 460 and relay 501 to battery. The circuit for the relay 613 is not effective to energize this relay until the original circuit of the relay 612 is opened. The relay 501 is energized to open the driving circuit including the line relays 311 and 513 at armature 521, to complete a locking circuit for itself at armature 520, and to complete a circuit for the relay 509 at armature 522. The relay 509 is energized to establish a locking circuit for itself at armature 540 and to prepare the driving circuit by connecting the relay 510 thereto at armature 539.

As before mentioned, the operation of the relay 612 opens the original circuit for the relay 416 and causes the removal of the short-circuit from the relay 415. This relay is operated to prepare signalling and control circuits at armatures 441 and 442, respectively.

By the opening of the driving circuit, the line relay 513 is deenergized to remove the short-circuit from the relay 514. The relay 514 is energized to open another point in the circuit of the relay 515 and to open another point in the circuit of the relay 513.

At the dispatcher's office, when the driving circuit is opened, the relay 311 is deenergized to remove the short-circuit from the relay 310. The relay 310 operates to open one point in the original circuit for the relay 309 at armature 338, to open another point in the circuit of the line relay 311 at armature 339, and to complete a circuit for the relay 315 at armature 340. The relay 315 is energized to connect the line relay 314 to the driving circuit at armature 352, and to establish a locking circuit for itself at armature 353. The driving circuit, including the line relays 314 and 510 in series, is now completed.

The line relay 314 is energized to complete a circuit for the relay 312 and for the relay 307. The relay 312 is operated to open the circuit of the relays 309 and 310 at armature 343 and to prepare a circuit for the relay 313. The relay 310 is deenergized to prepare circuits for the relays 309 and 311 at armatures 338 and 339, and to open the original energizing circuit of the relay 315 at armature 340. The relay 309 is deenergized to complete a circuit for the relay 313. This latter operation is ineffective until the short-circuit is removed from the relay 313 by the deenergization of the relay 314.

The relay 307 is operated to prepare a locking circuit for itself at armature 332, to open the locking circuit of the relay 308 at armature 331, and to complete an impulsing circuit at armature 333. The relay 308 is deenergized to complete the locking circuit of the relay 307.

The impulsing circuit extends from ground by way of back contact and armature 349, armature 333 and its front contact, conductor 22, armature 186 and its front contact, front contact and armature 149, armature 178 and its back contact, counting relay 123, back contact and armature 157, and back contact and armature 184 to battery.

The counting relay 123 is energized over this circuit and operates to open the circuit of the relay 215 at armature 181, to complete a circuit for the relay 122 at the front contact of this armature over a path that may be traced from ground by way of armature 182 and its back contact, armature 181 and its front contact, relay 122, relay 123, back contact and armature 157, and back contact and armature 184 to battery, and to prepare a circuit at armature 180 that extends from ground by way of said armature and its front contact, armature 175 and its back contact, conductor 10, relay 305 to armature 325. The counting relay 122 is not operated over this circuit by reason of the fact that it is shunted so long as the original circuit of the relay 123 is maintained.

By the removal of ground from conductor 21, the original circuit for the relay 215 is opened with the consequence that the short-circuit is removed from the relay 216. The relay 216, upon operating, opens an additional point in the original circuit of the relay 215 at armature 256, opens the circuit of the relay 304 at armature 257, and connects the signalling conductors 30 and 31, at armatures 258 and 259, to the contacts of the selecting relays.

The relay 304 is deenergized to complete a circuit for the relay 305, previously traced. The relay 305 is energized to establish a locking circuit for itself at armature 326 and to open the driving circuit, including the line relays 314 and 510, at armature 327. The line relay 314 is immediately deenergized to open the original energizing circuit of the relay 307 and to remove the short-circuit from the relay 313. The relay 313 is energized to open another point in the original circuit of the relay 312 at armature 346, to open another point in the circuit of the relay 314 at armature 347, to open the locking circuit of the relay 315 at armature 348, and to remove ground from the impulsing circuit at armature 349. The relay 315 is deenergized to connect the line relay 311 to the driving circuit.

By the opening of the impulsing circuit, the short-circuit is removed from the relay 122 and this relay is permitted to operate. Upon being energized, the relay 122 removes ground from conductor 10 at armature 175, opens the circuit of the relay 126 at armature 176, prepares a circuit for the counting relay 109 at armature 177, and at armature 179 completes a circuit that extends from ground by way of armature 182 and its back contact, armature 146 and its back contact, armature 179 and its front contact, conductor 20, and selecting relay 214 to battery. The relay 126 is deenergized to prepare a point in the circuit of the counting relay 109 at armature 186 and its back contact.

The removal of ground from conductor 10 causes the opening of the original energizing circuit of the relay 305. This relay is not deenergized, however, by reason of the fact that its locking circuit remains closed.

The selecting relay 214 is operated to complete a circuit for the signalling device 241 at spring 250, to prepare a signalling circuit at spring 251, to prepare a control circuit at spring 252, and to prepare a point in the circuit of the relay 304 at spring 253. The operation of the signalling device 241 apprises the dispatcher of the selecting position of the selecting relays. The circuit of the relay 304 is not completed by reason of the fact that the key K—1 is in a position opposite to that shown, and ground is removed from the conductor extending to the springs of the key K—11.

At the substation, the line relay 510 is deenergized, when the driving circuit is opened, to remove the short-circuit from the relay 511. The relay 511 is operated to open another point in the original circuit of the relay 512 at armature 544, to open a second point in the circuit of the line relay 510 at armature 545, to complete a circuit for the relay 517 at armature 543, and to open the locking circuits of the relays 501 and 509 at armature 542.

The relay 517 is energized to open the locking circuit of the relay 516 at armature 557, and to prepare a locking circuit for itself at armature 558. The relay 516 is deenergized to complete the locking circuit of the relay 517 at armature 555 and to open the impulsing circuit at armature 556. By the latter operation, the short-circuit is removed from the counting relay 613 and this relay is permitted to operate.

Upon being energized, the relay 613 removes ground from conductor 460 at armature 657, opens the circuit of the relay 624 at armature 658, prepares a circuit for the armature 658, prepares a circuit for the counting relay 602 at armature 659, opens another point in the original circuit of the relay 612 at armature 660, and at armature 661 completes a circuit that extends from ground by way of armature 685 and its back contact, armature 634 and its back contact, armature 661 and its front contact, conductor 470, and selecting relay 405 to battery. The selecting relay 405 is energized to prepare a signalling circuit at spring 426, to prepare a control circuit at spring 425, to prepare a circuit for the relay 719 at spring 427, and to complete a circuit at spring 428 for the relay 480. The relay 624 is deenergized to prepare another point in the circuit of the relay 603.

The removal of ground from conductor 460 brings about the deenergization of the relay 501. The relay 501 operates to prepare a circuit for the line relay 513 and to open the circuit of the relay 509. The relay 509 is deenergized to open another point in the circuit of the line relay 510 and to prepare another point in the circuit of the line relay 513. The relay 480 is energized to open another point in the circuit of the relay 509 at armature 481, and to complete a circuit extending from ground by way of armature 482 and its front contact, conductor 750, back contact and armature 747, and resistor 746 to battery. This circuit shunts the slow-releasing relay 724 which is maintained energized for a short interval of time after this short-circuit is established and is then deenergized.

The operation of the driving circuit does not occur by reason of the fact that the relay 305 at the dispatcher's office is locked energized. As this driving circuit is interrupted, the selecting relay 405 at the station remains energized, as does the relay 480. The relay 724 is then deenergized to prepare a point in the circuit of the relay 709 at armature 744, and to complete a circuit at armature 745 over a path that extends from ground by way of back contact and said armature, conductor 752, spring 427 and its working contact, conductor 753, and relay 719 to battery.

The relay 719 is energized to establish a locking circuit for itself at armature 738, to complete a circuit for the relay 709 at armature 737, and to complete a circuit at armature 736 that extends from ground by way of back contact and armature 744, armature 736 and its front contact, armature 743 and its back contact, and slow-releasing relay 722 to battery.

The relay 709 is energized over a circuit that extends from ground by way of back contact and armature 744, armature 742 and its back contact, armature 737 and its front contact, and relay 709 to battery. The relay 709 is energized to establish a locking circuit for itself at armature 731, to prepare a circuit for the slow-releasing relay 723 at armature 732, and to prepare a circuit at armature 730 for the relay 726.

The relay 722 is energized to complete a circuit for the slow-releasing relay 723 at armature 740, and to complete a circuit for the buzzer 721 at armature 741 over a path that extends from ground by way of back contact and armature 744, armature 741 and its front contact, back contact and armature 739, relay 721, and primary winding of transformer 720 to battery.

The relay 721 interrupts its own circuit, which includes the primary winding of the transformer 720. The secondary winding of the transformer 720 is connected by means of conductor 751 to the signalling conductor 31. The signalling conductor 31 is connected at the dispatcher's office to the primary winding of the audio-frequency transformer 260. The secondary winding of the audio-frequency transformer 260 is connected through the amplifier triode 261 and thence to the loud speaker 262. The interruptions through the primary circuit of the transformer 720 induce an alternating current of audio frequency into the secondary winding of the transformer. This current is transmitted to the amplifier triode 261 where it is amplified and applied to the loud speaker 262. The operation of the loud speaker gives an audible tone to the dispatcher.

The slow-releasing relay 723 is energized to open the circuit of the slow-releasing relay 722 at armature 743, to open the original energizing circuit of the relay 709 at armature 742, and to complete a circuit at the front contact of this armature that extends from ground by way of back contact and armature 744, armature 742 and its front contact, armature 730 and its front contact, and relay 726 to battery.

The relay 726 is energized to complete a circuit for the slow-releasing relay 725, at armature 748, over a path that extends from ground by way of armature 482 and its front contact, conductor 750, armature 748 and its front contact, and slow-releasing relay 725 to battery. The slow-releasing relay 725 is energized to remove the short-circuit from the slow-releasing relay 724 at armature 747. The slow-releasing relay 724 is energized to open the locking circuits of the relays 719 and 709 and also the circuits of the relay 726 and the buzzer 721 at armature 744, and to open the original energizing circuit of the relay 719 at armature 745. The operation of the armature 744 of the relay 724 also opens the circuit of the slow-releasing relay 723.

The relay 719 is deenergized to open another point in the circuit of the relay 709 at armature 737, and to open another point in the circuit of the relay 722 at armature 736. The relay 709 is deenergized to open one point in the circuit of the relay 726 at armature 730, and to open another point in the circuit of the relay 723 at armature 732. The relay 726 is now deenergized. By this operation, the armature 748 begins to vibrate to send impulses to the slow-releasing relay 725 so that this relay is maintained energized for a short interval of time. The slow-releasing relay 722 is deenergized to open another point in the circuit of the buzzer 721. The slow-releasing relay 723 is deenergized to prepare another point in the circuit of the relay 722 at armature 743, and to prepare a point in the circuit of the relay 709 at armature 742.

When the circuit including the buzzer 721 is opened, the operation of the loud speaker 262 at the dispatcher's office is stopped and, one signal having been produced, the dispatcher knows that he is in connection with the first apparatus unit or the circuit interrupter C, which is the one that he desires to operate.

The slow-releasing relay 725 at the substation is finally deenergized. By the deenergization of the relay 725, a circuit is completed for shunting the slow-releasing relay 724. The relay 724 is deenergized after an interval of time to initiate the same cycle of operations. Consequently, this one tone is repeatedly produced at the dispatcher's office in order to inform the dispatcher that the proper selection has occurred.

When the dispatcher desires to operate the circuit interrupter C, he will depress the common control key K. As a result of this operation, a circuit is completed that extends from ground by way of the upper springs of key K, working contact of spring 217 of key K—1 and said spring, front contact and armature 222, working contact of spring 252 and said spring, front contact and armature 258, trunk conductor 30, armature 441 and its front contact, spring 425 and its working contact, armature 419 and its back contact, and relay 402 to battery. The relay 402 is energized to complete a circuit for the closing coil of the circuit breaker C. The closing coil 403 brings about the closing of the circuit interrupter in a well-known manner.

Simultaneously with the completion of this control circuit, there is a signalling circuit completed that extends from battery by way of front contact and armature 420, working contact of spring 426 and said spring, front contact and armature 442, conductor 31, armature 259 and its front contact, spring 251 and its working contact, armature 230 and its back contact and relay 203 to battery.

Inasmuch as the proper signalling device 225 is operated to indicate that the circuit interrupter is in its open position, there is no change in the signalling devices. The action of a circuit interrupter at the substation causes the opening of the circuit of the slow-releasing relay 400 at the pallet switch 423 and the closure of a circuit, before the slow-releasing relay is deenergized, that extends from ground by way of auxiliary switch 423, armature 417 and its front contact, conductor 478, front contact and armature 580, armature 518 and its front contact, armature 537 and its back contact, and relay 507 to battery.

The relay 507 is energized to prepare a point in the circuit of the relay 506 at armature 534, and to complete a circuit that extends from ground by way of back contact and armature 533, armature 535 and its front contact, relay 508 and relay 507 to battery. The relay 508 is short-circuited until the circuit of the relay 507 is opened. When the slow-acting relay 400 is finally deenergized, the short-circuit is removed from the relay 508 and this relay is operated to place ground upon conductor 478 at armature 536. By the grounding of conductor 478, a starting circuit is prepared.

The deenergization of the slow-releasing relay 400 also connects ground to the previously traced signalling circuit that includes the relay 203 at the office. Upon operating, the relay 203 attracts its armature 229, whereby the armatures 226, 227 and 228 of the relay 202 are permitted to resume their normal position. By the operation of the armature 226, the signalling device 225 is extinguished and the signalling lamp 224 is lighted. The operation of the armature 227 completes a circuit for the relay 204, while the armature 228 opens one point in the circuit of the relay 200. By the change in signalling devices, the dispatcher is informed that the desired action at the substation has taken place.

The slow-releasing relay 204 is energized to open the circuit of the signalling relay 203 at armature 230, and to complete a circuit at armature 231 that extends from battery by way of said armature and its front contact, relay 201, and working contact of spring 220 and said spring to ground. The relay 201 is energized over this circuit and operates its armature 223 to permit the release of the armatures 221 and 222 of the relay 200. By the operation of the armature 222, the control circuit, including the relay 401, is opened, while, by the operation of the armature 221, a circuit is completed that extends from ground by way of spring 220 and its working contact, back contact and armature 221, springs of key K—11, working contact of spring 253 and said spring, conductor 27, and relay 304 to battery. The relay 304 is energized to open the locking circuit of the relay 305 at armature 325 and the relay 305 is deenergized to prepare the driving circuit.

The driving circuit now continues to function in the same manner as before. The line relays 311 and 314 are connected to this circuit alternately to cause the operation of the counting relays in the following sequence, 109, 108, 121, 120, 107, 106, 119, 118, 105, 104, 117, 116, 103, 102, 115, 114, 101, 100, 113 and 112. By the operation of the counting relays, the selecting relays 213, 212, 211, 210, 209, 208, 207, 206 and 205 are operated in the sequence mentioned, each relay being released upon the energization of the next succeeding counting relay. That is, the selecting relay 214 is released by the energization of the counting relay 109. The selecting relays, in operating, prepare certain circuits for connecting the various keys, such as K—1, and signalling devices, such as 224 and 225, to the driving circuit. Inasmuch as it has been assumed that the dispatcher desires only to operate the circuit interrupter C, no further control circuits will be completed and the action of the driving circuit, to cause the operation of the relays just mentioned, will be continued.

At the substation, the line relays 513 and 510 are alternately connected to the driving circuit and operated to bring about the energization of the counting relays in the following sequence, 602, 603, 614, 615, 604, 605, 616, 617, 606, 607, 618, 619, 608, 609, 620, 621, 610, 611, 622 and 623. The operation of the counting relays causes the energization of the selecting relays in the following sequence, 406, 407, 408, 409, 410, 411, 412, 413 and 414. The selecting relays are deenergized in the same sequence by the operation of the next succeeding counting relay. That is, the selecting relay 405 is deenergized by the operation of the counting relay 602. The operation of the selecting relays connects various relays, such as 400 to 402, inclusive, to the signalling and control circuits so that the proper signals are transmitted to the dispatcher's office to apprise the dispatcher of the position of the various apparatus units.

During the operation of the selecting relays, no tones are sent to the dispatcher's office by reason of the fact that, while the relay 480 is energized upon the operation of each selecting relay and the relay 724 is short-circuited, the time that this relay takes to deenergize is sufficiently long so that it is not deenergized before this circuit is again completed by the deenergization of the relay 480. Consequently, the only time that the code-sending device functions is when an apparatus unit is selected, and the driving circuit is interrupted in a manner similar to that previously described.

It will be obvious that, in order to insure proper action of the driving circuit, it is necessary to alternately connect the line relays 311 and 314 and the line relays 513 and 510 to the driving circuit at the dispatcher's office and substation, respectively. Otherwise, there is no driving circuit completed. The alternate connection of the line relays and the action of the driving circuit is controlled indirectly by the energization of the counting and selecting relays, it being necessary that the line relays 311 and 314 be operated to bring about the energization of a single counting relay, such as counting relay 111. In the same manner, it is necessary that the counting relays 513 and 510 be operated to bring about the operation of the counting relay 600 at the substation.

The operation of the counting relays, such as 111 and 600, causes the operation of the relay 305 and 501 whereby the action of the driving circuit is interrupted. This operation brings about the simultaneous energization of whatever selecting relays are selected. The operation of these selecting relays, in turn, controls the operation of the relays 304 and 480 to close the driving circuit. By this interrelation of circuits, the synchronous action of the relay selecting apparatus is insured. This is true even though the control or driving circuit be subjected to inductive interference because, unless the line relays are properly connected to the driving circuit, there will be no selecting action.

When the counting relay 113 is operated by the energization of the line relay 314, the circuit of the selecting relay 205 is opened and a circuit is completed for the relay 112. The circuit for the relay 112 is not effective until the circuit of the relay 113 is opened. The relay 205 is deenergized to open certain signalling circuits and to remove ground from conductor 27, whereby the relay 304 is deenergized to complete a circuit for the relay 305. The relay 305 is operated to open the circuit of the relay 314. This relay is deenergized to cause the operation of the relay 313. The relay 313 is operated to open the impulsing circuit, whereby the short-circuit is removed from the relay 112. Upon operating, the relay 112 opens the original energizing circuit of the relay 305 at armature 155, opens the circuit of the relay 126 at armature 156, and removes the short-circuit from the relay 125 at armature 157.

The relay 125 is now energized in series with all the counting relays. This relay operates to remove ground from conductor 23 at armature 185, and to complete a circuit for the slow-releasing relay 124 at the front contact of this armature. By the removal of ground conductor 23, the circuit of the relays 215 and 216 is opened and these relays are deenergized. The relay 215 is deenergized to open another point in the circuit of the relay 216 and to open another point in the circuit of the relay 304. The relay 216 is deenergized to prepare a circuit for the relay 215 at armature 256, to prepare a point in the circuit of the relay 304 at armature 257, to open one point in a signalling circuit at armature 258, to open one point in a control circuit at armature 259, and to prepare a holding circuit at the back contact of this armature.

The slow-releasing relay 124 is energized to remove ground from conductor 25 at armature 183 and to place ground upon the conductor 24 at the front contact of this armature. In addition, the operation of the relay 124 serves to open the circuits of all the counting relays 100 to 123, inclusive, and also the circuit of the relay 125 at armature 182. The relay 125 is deenergized to open the circuit of the slow-acting relay 124, although this relay remains energized for a short interval of time. The counting relays are deenergized to restore certain circuits to normal.

The removal of ground from conductor 25 brings about the deenergization of the relay 305 and the relays 312 and 313. The relay 305 is deenergized to prepare one point in the driving circuit. The relays 312 and 313 are deenergized to restore certain circuits to normal. By the connection of ground to conductor 24, a circuit is completed for the relay 300. The relay 300 is energized to establish a locking circuit for itself at armature 316, to open the circuits of the relays 301 and 302 at armature 317, and to open the circuit of the relay 306 at armature 318. The relay 301 is deenergized to open one point in the circuit of the relay 302. The relay 302 is deenergized to prepare a point in the holding circuit at armature 321. The relay 306 is deenergized to open the driving circuit at armature 330 and to prepare a point in the starting circuit at armature 329. In this manner, the apparatus at the dispatcher's office is restored to normal.

At the substation, the counting relay 622 is energized by the operation of the line relay 513. The relay 622 is operated to bring about the energization of the relay 501 and the opening of the circuit of the selecting relay 414. The relay 414 is deenergized to open the circuit of the relay 480. The relay 480 is deenergized to prepare a circuit for the relay 509. The relay 501 is energized to complete a circuit for the relay 509. The operations of the relays 501 and 509 connect the line relay 510 to the driving circuit so that this relay is energized in series with the line relay 314 at the dispatcher's office.

When the driving circuit is opened by the operation of the relay 305 in the manner described, the relay 511 is permitted to energize. As a result of this operation, the relay 516 is deenergized and the short-circuit is removed from the counting relay 623. Upon operating, the counting relay 623 opens the original energizing circuit of the relay 501 at armature 678, opens the circuit of the relay 624 at armature 679, and removes the short-circuit from the relay 625 at armature 680. The relay 625 is operated to remove ground from the conductor 473 at armature 684 and to complete a circuit for the relay 626 at the front contact of this armature.

By the removal of ground from conductor 473, the circuits of the relays 415 and 416 are opened. The relay 416 is deenergized to open one point in the circuit of the relay 415. The relay 415 retracts its armatures to prepare one point in the circuit of the relay 416 at armature 440, to open one point in the signalling circuit at armature 441, to open one point in the control circuit at armature 442, and to prepare a point in the holding circuit at the back contact of this armature.

The slow-releasing relay 626 is energized to open the circuits of all the counting relays 600 to 623, inclusive, and also to open the circuit of the relay 625. Various counting relays are deenergized to restore certain circuits to normal. The relay 625 is deenergized to open the circuit of the relay 626, which remains energized for a short interval of time. The removal of ground from conductor 475 brings about the deenergization of the relays 511 and 512. These relays retract their armatures to restore certain circuits to normal.

By the connection of ground to conductor 474, a circuit is completed for the relay 503. The relay 503 is operated to open certain points in the circuits of the relays 504 and 505 at armature 528, to open the circuit of the relay 500 at armature 526, and to establish a locking circuit for itself at armature 527. The relay 504 is deenergized to open one point in the circuit of the relay 505 at armature 529, and to open one point in the circuit of the relay 506 at armature 530. The relay 505 is deenergized to prepare a circuit for the relay 504 at armature 531 and to prepare a holding circuit at armature 532.

The holding circuit is now completed over a path that extends from ground by way of back contact and armature 321, holding relay 303, conductor 26, back contact and armature 259, conductor 31, armature 442 and its back contact, conductor 476, armature 532 and its back contact, and holding relay 502 to battery.

The holding relay 303, at the dispatcher's office, is energized to open the locking circuit of the relay 300 and to prepare a circuit for the starting relay 301. The relay 300 is deenergized to prepare a circuit for the relay 302 at armature 317 and to prepare a circuit for the relay 306 at armature 318.

At the substation, the holding relay 502 is energized to open the locking circuit of the relay 503 at armature 525, and to prepare a point in the circuit of the relay 506 at the front contact of this armature. The relay 503 is deenergized to prepare a circuit for the relay 500 at armature 526 and to prepare a circuit for the relay 505 at armature 528. In this manner, the apparatus at the substation is restored to normal.

When the relay 502 is deenergized, there is a starting circuit completed that extends from ground upon grounded conductor 478 by way of front contact and armature 573, armature 518 and its back contact, armature 531 and its back contact, and relay 504 to battery. The relay 504 is energized to complete a circuit for the relay 505 at armature 529, and to complete a circuit, at armature 530, that extends from ground by way of armature 525 and its front contact, front contact and armature 530, relay 506, and front contact and armature 534 to battery. The relay 505 is not energized so long as the original circuit for the relay 504 is maintained.

The relay 506 is operated to open the circuits of the relays 507 and 508. The relay 508 is deenergized to open the circuit of the relay 504. The relay 505 is immediately energized in series with the relay 504. By the operation of the relay 505, the holding circuit is opened and the holding relays 303 and 502 at the dispatcher's office and substation, respectively, are deenergized. The results of the deenergization of these relays are the same as those previously described and function to bring about the selecting operation of the relay apparatus. The purpose of this reoperation is to positively check all the supervisory indications of the dispatcher.

In order to describe the operation of the code-sending device more in detail, it will be assumed that it is desired to select and operate another circuit interrupter that is selected by the operation of the second selecting relay, such as relay 406. When the relay 406 is operated, in addition to certain other results, a circuit is completed for the relay 480. The relay 480, among other things, short-circuits the slow-releasing relay 724.

By reason of the fact that it has been assumed that the dispatcher desires to operate the circuit breaker that is operated by this selecting relay, the action of the driving circuit will be interrupted in a manner similar to that already described. Consequently, the slow-releasing relay 724 has sufficient time to be deenergized. As a result of this operation, a circuit is completed that extends from ground by way of back contact and armature 745, conductor 752, spring 429 and its working contact, conductor 754, and relay 718 to battery. The relay 718 is energized to establish a locking circuit for itself at armature 735 to ground by way of armature 744 and its back contact, to complete a circuit for the relay 708 at armature 734, and to complete a circuit for the slow-releasing relay 722 at armature 733.

The circuit of the relay 708 extends from ground by way of back contact and armature 744, armature 742 and its back contact, armature 737 and its back contact, armature 734 and its front contact, and relay 708 to battery. The circuit of the slow-releasing relay 722 extends from ground by way of back contact and armature 744, armature 733 and its front contact, armature 743 and its back contact, and slow-releasing relay 722 to battery.

The relay 708 is energized to establish a locking circuit for itself at armature 728, to prepare a circuit for the slow-releasing relay 723 at armature 729, and to prepare a circuit for the relay 719 at armature 727. The relay 722 is energized to complete a circuit for the buzzer 721 at armature 741, and to complete a circuit for the slow-releasing relay 723 at armature 740. This latter circuit extends from ground by way of back contact and armature 744, armature 729 and its front contact, armature 740 and its front contact, and slow-releasing relay 723 to battery. By the operation of the buzzer, a tone is produced by the loud speaker 262 at the dispatcher's office.

The slow-releasing relay 723 is energized to open the circuit of the slow-releasing relay 722 at armature 743, and to complete a circuit at armature 742 that extends from ground by way of back contact and armature 744, armature 742 and its front contact, armature 730 and its back contact, armature 727 and its front contact, and relay 719 to battery.

The relay 719 is energized over this circuit and operates to establish a locking circuit for itself at armature 738, to prepare a circuit for the relay 709 at armature 737, and to complete another point in the circuit of the relay 722 at armature 736. The slow-releasing relay 722 is deenergized, after a short interval of time, to open the circuit of the slow-releasing relay 723 and to open the circuit of the buzzer 721. The buzzer 721 ceases to operate and, as a consequence thereof, the operation of the loud speaker at the dispatcher's office is likewise interrupted.

After a short interval of time, the slow-releasing relay 723 is deenergized to open the original energizing circuit of the relay 719 at armature 742, to complete a circuit for the relay 709 at the back contact of this armature, and to complete a circuit for the slow-releasing relay 722 at armature 743. The relay 709 is energized to prepare a circuit for the relay 726 at armature 730, to open the locking circuit of the relay 708 at armature 731, to establish a locking circuit for itself at the front contact of this armature, and to prepare another point in the circuit of the relay 723 at armature 732.

The relay 722 is energized to again complete the circuit of the buzzer 721 at armature 741, and to complete the circuit of the relay 723 at armature 740. The relay 723 is energized to open the circuit of the relay 722 at armature 743, and to complete a circuit at armature 742 that extends from ground by way of back contact and armature 744, armature 742 and its front contact, armature 730 and its front contact, and relay 726 to battery.

The relay 726 is operated to complete a circuit for the slow-releasing relay 725. The relay 725 is operated to remove the short-circuit from the relay 724. The relay 724 is energized to bring about the release of the apparatus in a manner substantially the same as that before described.

Thus it will be seen that two audible signals are produced at the dispatcher's office to indicate to the dispatcher that the apparatus unit selected by the selecting relays is the second unit. These signals are repeated in the same manner as before, so long as the dispatcher remains in connection with this unit.

In a like manner, when the dispatcher desires to operate a predetermined unit, the selecting operation at the substation gives a tone or audible indication to the dispatcher indicating the number of the apparatus unit selected.

When the circuit interrupter is opened, there is a circuit completed for the slow-to-operate relay 400 by the auxiliary switch 423. Before the slow-to-operate relay 400 is energized, a circuit is completed that extends from ground by way of auxiliary switch 423, armature 418 and its back contact, conductor 478, front contact and armature 573, armature 518 and its back contact, armature 531 and its back contact, and relay 504 to battery. The relay 504 is energized to complete a circuit for the relay 505. When the slow-to-operate relay 400 is finally energized, ground is removed from the conductor 478 with the result that the short-circuit of the relay 505 is removed and this relay is operated to open the holding circuit. By this operation, the selecting action is initiated.

Under certain conditions, it will be obvious that the dispatcher may find it desirable to connect with a certain apparatus unit and remain in connection therewith while he observes its operation, responsive to control. To accomplish this result, the dispatcher is provided with a number of keys, such as K—2 to K—11, inclusive. To describe this operation, it will be assumed that the dispatcher desires to observe the operation of the circuit interrupter C. In order to accomplish this result, the dispatcher will operate the key K—11 and will then operate the start key K—12.

The operation of the selecting apparatus proceeds as before and the selecting relays 214 and 405 at the dispatcher's office and station, respectively, are energized by the action of the driving circuit. Under these conditions, the relay 305 is locked energized and the circuit of the relay 304, which opens the locking circuit of the relay 305, is opened by the operation of the key K—11. Consequently, until this key is restored to normal, the apparatus will remain in this position by reason of the driving circuit being opened.

Therefore, the dispatcher is able to operate the circuit interrupter C as often as he desires and observe its action by the operation of the supervisory devices 224 and 225. The tone sending apparatus functions in the same manner as before to give an audible indication to the dispatcher to apprise him of the completion of the desired selecting operation.

When the dispatcher desires to have the selecting apparatus continue its selecting action, he will restore the key K—11 to normal, whereby the circuit for the relay 304 is permitted to be closed. As a result of this action, the relay 305 is deenergized to complete the driving circuit. The operation of the selecting apparatus proceeds in the same manner as before.

My invention is not limited to the particular arrangement of the apparatus described, but may be variously modified without departing from the spirit and scope thereof, as set forth in the appended claims.

I claim as my invention:

1. In a signalling system, a first station, a second station, apparatus units at said second station, distributors at each of said stations for sequentially selecting said units, means for operating said distributors in synchronism, means including said distributors for selecting in sequence said apparatus units for operation from said first station, means for bringing said distributors to a stop at any selecting position, a code-sending device at the second station comprising a chain of relays common to all of said apparatus units, means including the distributor at the second station for operating said code-sending device in response to a selection to send a code individual to the selecting position, means at said first station responsive to the code sent by said code-sending device for audibly indicating said selection, and means including said distributors for operating said selected apparatus unit.

2. In a signalling system, a first station, a second station, a signalling line connecting said stations, apparatus units at said second station, signalling devices individual thereto at said first station, distributors at each of said stations, means for operating said distributors in synchronism, means whereby said distributors sequentially associate said apparatus units at said second station and said signalling devices individual thereto at said first station with said signalling line simultaneously, means including said distributors for selecting in sequence said apparatus units for operation from said first station, means for bringing said distributors to a stop at any selecting position, a code-sending device responsive to said selection for transmitting code combinations of impulses individual to the selecting position over said signalling line, and an audible signalling device at said first station responsive to said impulses for indicating said selection.

3. In a supervisory control system, a first station, a second station, a distributor at each of said stations, means for operating said distributors in synchronism to a plurality of selecting positions sequentially, means for bringing said distributors to a stop at any desired selecting position, a code-sending device, means responsive to the stopping of said distributors, at a position for causing said device to transmit a selecting code combination of impulses from said second station to said first station individual to the selecting position in which the distributors have been stopped.

4. In a supervisory control system, a first station, a second station, a distributor at each of said stations, means for operating said distributors in synchronism, means for bringing said distributors to a stop at any desired position, a code-sending device, means operating in response to the stopping of said second station distributor at a selecting position for operating said device to transmit code combinations of impulses from said second to said first station individual to said second station distributor stop position and an audible device responsive to said code impulses.

5. In a supervisory control system, a first station, a second station, a chain of relays at each of said stations, means for operating said chains of relays in synchronism, means for bringing said chains of relays to a stop at any desired position, a code-sending device, means operating in response to the stopping of said chains of relays at a position for causing the device to transmit code combinations of impulses individual to said second station relay chain position from said second station to said first station and an audible device responsive to said code signals.

6. In a supervisory control system, a first station, a second station, a distributor at each of said stations, apparatus units at said second station, signalling devices individual thereto at said first station, a control line connecting said stations, a supervisory line connecting said stations, means for operating said distributors in synchronism, means whereby said distributors sequentially associate said apparatus units with said supervisory and said control line while simultaneously associating said signalling devices at said first station, with said supervisory line, means for bringing said distributors to a stop at any one of said selected positions, means responsive to the stopping of said distributors for transmitting a code indicative of said second-station selection from said second to said first station, means including said control line for operating one of said selected apparatus units and means including said supervisory line responsive to the operation of said apparatus unit for operating said individual signalling device.

7. In a supervisory control system, a first station, a second station, a chain of relays at each of said stations, apparatus units at said second station, signalling devices individual thereto at said first station, a control line connecting said stations, a supervisory line connecting said stations, means for operating said chains of relays in synchronism, means including said relay chains for sequentially associating said apparatus units with said supervisory and said control line while simultaneously associating said signalling devices at said first station with said supervisory line, means for bringing said chains of relays to a stop at any one of said selected positions, means responsive to the stopping of said chains of relays for transmitting a code indicative of said second station relay chain selection to said first station, means including said control line for operating said selected apparatus units and means including said supervisory line responsive to the operation of said apparatus units for operating said individual signalling device.

8. In a supervisory control system, a first station, a second station, apparatus units at said second station, a chain of relays at each of said stations, means for operating said chains of relays in synchronism, means including said chains for sequentially selecting said apparatus units for operation, means for bringing said relay chains to a stop at any selecting position, a second chain of relays at said second station common to all of said apparatus units, and means responsive to the stopping of the relay chains at the selecting position of one of said apparatus units for starting said second chain of relays into operation to transmit a code combination of impulses to said first station, individual to said stop selecting position of said second station relay chain.

9. In a supervisory control system, a first station, a second station, apparatus units at said second station, a chain of relays at each of said stations, means for operating said chain of relays in synchronism, means whereby said relays sequentially select said apparatus units for operation, means for bringing said relay chains to a stop at any selecting position, a second chain of relays at said second station common to all of said apparatus units, means responsive to the stopping of said second station relay chain at a selecting position for starting said second chain of relays into operation to transmit a code combination of impulses to said first station, individual to said stop selecting position, an audible signalling device at the first station, and means at said first station responsive to said code combination of impulses for operating the audible signalling device in accordance with the code received.

10. In a signalling system, a first station, a second station, a chain of relays at each of said stations, apparatus units at said second station, means for operating said chains of relays in synchronism, means whereby said relays sequentially select said apparatus units for operation from said first station, means for bringing said relay chains to a stop at any selecting position, a second chain of relays at said second station, means responsive to the selecting position of said apparatus units for starting said second chain of relays into operation to transmit signals corresponding to the selecting positions to said first station and means including said first-mentioned chain at said second station for controlling the transmission of said signals.

11. In a signalling system, a first station, a second station, a chain of relays at each of said stations, apparatus units at said second station, means for operating said chains of relays in synchronism, means whereby said relays sequentially select said apparatus units for operation from said first station, means for bringing said relay chains to a stop at any selecting position, a second chain of relays at said second station, means responsive to the stopping of said relay chains at the selecting position of said apparatus units for starting said second chain of relays into operation to transmit signals individual to the selecting positions to said first station, means including said first mentioned chain at said second station for controlling the transmission of said signal and means at the first station responsive to said signals for operating an audible signalling device in accordance with the selection made.

12. In a signalling system, a first station, a second station, apparatus units at said second station, synchronously-operated selecting apparatus at each of said stations, means whereby said selecting apparatus at the stations are adapted to select said units sequentially during a single complete cycle of operation, means for stopping the selecting apparatus at a selecting position, means including said synchronously-operating selecting apparatus stopped at a selecting position for selecting one of said apparatus units for operation from said first station, means responsive to the selecting position of the selecting apparatus at the second station for transmitting a code combination of impulses individual to the selecting position to said first station, means at said first station responsive to said code combination of impulses for providing an audible indication individual to said selection at said second station, and means including said synchronously-operated selecting apparatus for operating said selected apparatus units.

13. In a signalling system, a first station, a second station, apparatus units at said second station, distributors at each of said stations having selecting positions individual to each of said units, means for operating said distributors in synchronism, means including said distributors operating in synchronism for selecting said apparatus units for operation from said first station, means for bringing said distributors to a stop at any selecting position, means including a second distributor at the second station responsive to the stopping of said second station distributor in a selecting position for transmitting signals in accordance therewith to said first station, means at said first station controlled by said signals for providing audible signals individual to said selection at said first station, and means including said synchronous distributors for operating said selected apparatus units.

14. In a supervisory control system, a first station, a second station, synchronously-operated distributors at each of said stations, apparatus units at said second station, signalling devices individual thereto at said first station, means including said distributors for sequentially selecting said apparatus units for operation from said first station, means for bringing said distributors to a stop at any selecting position, a code transmitter at said second station operated in response to the selecting position of said second station selector for transmitting a code combination to said first station individual to said selecting position, means responsive to said code for audibly indicating said selection at said first station, means including said distributors and said selecting position for operating said selected apparatus unit, and means including said distributors and said selecting position for operating said signalling device individual to said apparatus unit in response to the operation of said apparatus unit.

15. In a signalling system, a first station, a second station, apparatus units at said second station, a distributor at each of said stations for sequentially selecting said units during a single cycle of the operation thereof, means for operating said distributors in synchronism, means for bringing said distributors to a stop at any selecting position, means including said distributors at a selecting position for selecting one of said apparatus units for operation from said first station, a code transmitter at said second station, means responsive to said second station selecting position for operating said code transmitter to transmit signals to said first station in accordance with said selecting position, means at said first station responsive to the signalling operation of said code transmitter for audibly indicating said selection, and means including said distributors for operating said selected apparatus unit.

16. In a signalling system, a first station, a remote station, apparatus units at said remote station, synchronously-operated chains of relays at each of said stations for successively selecting said units during an operating cycle, means including said sychronously-operated chains of relays stopped at a selecting position for selecting said apparatus units for operation from said first station, means for bringing said relay chains to a stop at any selecting position, means responsive to the selecting position of said second station relay chains for transmitting signals individual to the selecting position to said first station, means responsive to said signals for providing an audible indication individual to said selection at said first station, and means including said synchronously-operated chains of relays for operating said selected apparatus units.

17. In a signalling system, a first station, a second station, apparatus units at said second station, chains of relays at each of said stations, means whereby said chains of relays are adapted to select said units in sequence during an operating cycle of said chains, means for operating said chains of relays in synchronism, means including said chains of relays operating in synchronism for selecting said apparatus units for operation from said first station, means for bringing said relay chains to a stop at any selecting position, an audible signalling device at the first station, relay means responsive to the selecting position at which said relay chains are stopped for transmitting different predetermined signals to the first station, means responsive to said signals for operating said audible signalling device in a manner individual thereto at said first station, and means including said synchronous chains of relays stopped at the selecting positions for operating said selected apparatus units.

18. In a supervisory control system, a first station, a second station, synchronously-operated chains of relays at each of said stations, apparatus units at said second station, signalling devices individual thereto at said first station, means including said chains of relays for selecting said apparatus units for operation from said first station, means for bringing said relay chains to a stop at any selecting position, a code transmitter at the second station comprising a second chain of relays operated in response to the second station selection stopping position for transmitting a code individual thereto to said first station, means responsive to the operation of said code transmitter for audibly indicating said selection at said first station, means including said chains of relays at a selecting position for operating said selected apparatus unit, and means including said chains of relays at the same selecting position for operating the signalling device individual to said selected apparatus unit in response to the operation of said apparatus unit.

19. In a signalling system, a first station, a second station, apparatus units at said second station, a chain of relays at each of said stations for successively selecting said units in a single operating cycle, means for operating said chains of relays in synchronism, means including said chains of relays for selecting said apparatus units for operation from said first station, means for bringing said relay chains to a stop at any selecting position, a relay code transmitter, means responsive to a second station selection of one of said apparatus units for operating said relay code transmitter to transmit signals indicative of the selecting position to the first station, means controlled by the code transmitted for audibly indicating said selection at said first station, and means including said chains of relays stopped at the selecting position for operating said selected apparatus units.

In testimony whereof, I have hereunto subscribed my name this 8th day of March, 1926.

ROBERT C. HUMMEL.